United States Patent [19]

Takizawa

[11] Patent Number: 5,371,535
[45] Date of Patent: Dec. 6, 1994

[54] MULTIPLEXING TRANSMISSION APPARATUS FOR IMAGE SIGNAL AND MULTIPLEXING SYSTEM

[75] Inventor: Masaaki Takizawa, Tokyo, Japan

[73] Assignee: Hitachi, Ltd., Tokyo, Japan

[21] Appl. No.: 5,211

[22] Filed: Jan. 15, 1993

[30] Foreign Application Priority Data

Jan. 30, 1992 [JP] Japan .................................. 4-014479

[51] Int. Cl.⁵ .......................................... H04N 7/18
[52] U.S. Cl. .................................. 348/15; 348/17; 348/473; 348/518; 348/588; 348/722; 370/62
[58] Field of Search .................... 348/15, 17, 473, 588, 348/722, 518, 519; 370/62; H04N 7/18

[56] References Cited

U.S. PATENT DOCUMENTS

| | | | |
|---|---|---|---|
| 4,689,683 | 8/1987 | Efron | 348/722 |
| 4,745,479 | 5/1988 | Waehner | 348/588 |
| 4,748,618 | 5/1988 | Brown | 348/17 |
| 4,882,743 | 11/1989 | Mahmoud | 348/17 |
| 5,040,067 | 8/1991 | Yamazaki | 348/588 |
| 5,072,442 | 12/1991 | Todd | 348/15 |
| 5,157,491 | 10/1992 | Kassatly | 370/62 |

FOREIGN PATENT DOCUMENTS 3-6190 1/1991 Japan .

Primary Examiner—Howard W. Britton
Attorney, Agent, or Firm—Antonelli, Terry, Stout & Kraus

[57] ABSTRACT

A compact and low-cost multiplexing apparatus for a plurality of high-efficiency encoded image signals is capable of improving an image quality and of shortening a transmission delay time. The multiplexing apparatus for an image signal includes delay compensating circuits provided corresponding to a plurality of image terminals, for storing image encoded signals sent from the respective image terminals; a control circuit for performing a control to form a large frame signal from small frame signals whose number is equal to at the most the number of image signal sources, by detecting frame head codes from input/outputs of the delay compensating circuits, thereby not being duplicated from a plurality of delay compensating circuits, and also adding circuit for adding a frame start code to each of large frames. Even when the frame rates are different between terminals, since all of the image encoded signals are not decoded but multiplexed, deterioration of image qualities and transmission delays can be reduced. Since apparatuses for encoding/decoding images can be omitted, the entire multiplexing apparatus can be made compact.

5 Claims, 6 Drawing Sheets

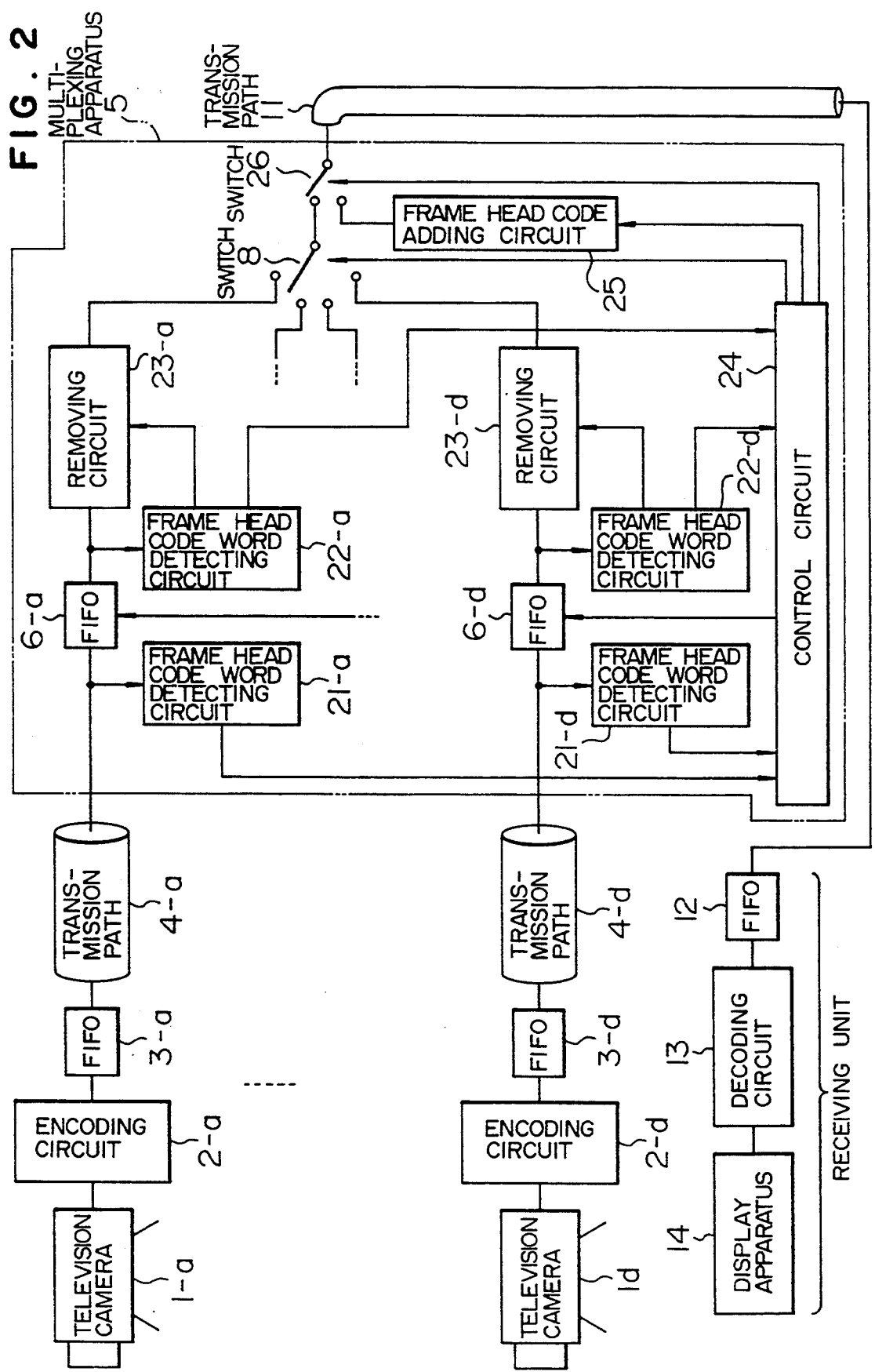

MULTIPLEXING TRANSMISSION APPARATUS FOR IMAGE SIGNAL AND MULTIPLEXING SYSTEM

BACKGROUND OF THE INVENTION

The present invention generally relates to a transmission apparatus and a transmission system used in a television conference and the like, for synthesizing image signals derived from a plurality of TV cameras positioned at a large number of places, and for outputting the synthesizing image signals. More specifically, the present invention is directed to a multiplexing transmission apparatus and system for an image signal, in which small images (will be referred to "small frames" hereinafter) which have been sent out from a plurality of TV cameras via encoding apparatuses at independent time intervals in the asynchronous mode, are synthesized into a single image (will be referred to a "large frame" hereinafter) in accordance with a predetermined rule, and also such a control operation is carried out that a synchronized image can be reproduced, as viewed from a reproducing side.

A conventional multiplexing apparatus has such an arrangement as shown in FIG. 1, which is employed in a TV conference system for synthesizing image signals derived from a plurality of TV cameras to be outputted.

(1) At a transmission side, each of image signals picked-up by a plurality of television cameras (will be also referred to "transmission terminals" hereinafter) 1-1, 1-2, . . . , 1-n, is encoded by encoding circuits 2-1, 2-2, . . . , 2-n. The encoded image signals are temporarily stored into smoothing memories so-called as a "FIFO" (simply, referred to a "FIFO") 3-1, 3-2, . . . , 3-n, and are read out therefrom at a constant speed. Then, the read image signals are transmitted to transmission paths 4-1, 4-2, . . . , 4-n.

(2) In the multiplexing apparatus 5, the code words transmitted from the transmission paths 4-1, 4-2, . . . , 4-n are temporarily stored in delay compensating circuits 6-1, 6-2, . . . , 6-n. Subsequently, the code words are read out from the respective delay compensating circuits 6-1, 6-2, . . . , 6-n, and the read code words are sent out to the transmission path 11 at a constant speed and then transmitted to the reception terminal 14.

(3) At the reception side, after the speed control has been performed by the FIFO 12, the code words are read out, and then the original large frame is reproduced by the decoding circuit 13 to be displayed on the display apparatus 14.

The above-described conventional multiplexing apparatus is opened in, for instance, JP-A-3-6190.

SUMMARY OF THE INVENTION

In the above-explained conventional multiplexing apparatus, it is a precondition that the number of frames (frame rate) which are transmitted from the respective transmission terminals per second, are constant.

However, since the actual image signals derived from the respective transmission terminals are variable-length-encoded and the resultant encoded image signals are transmitted to the multiplexing apparatus, the amount of the code words which are produced, depending upon coarse/fine degrees of an object to be imaged, and also movement amounts, is increased or decreased. Thus, there are many cases that a so-called "frame frequency" is varied. Accordingly, there is such a problem that the frame frequencies of the image signals derived from the respective transmission terminals are different from each other. If the frame frequencies of the image signals derived from the respective transmission terminals would be different from each other, the image signal having the high frame frequency (namely, image signal with much information) should be synthesized with the image signal having the low frame frequency in accordance with the conventional synthesizing method for simply synthesizing the frame signals. As a consequence, since the image signals must be temporarily stored into the memory, such a memory having a large memory capacity is required. Furthermore, due to the overall time delays in the reproduced image signals, no matching condition can be established among these images and between the images and sounds. This may cause performance of a TV conference system to be deteriorated.

An object of the present invention is to provide both of a multiplexing transmission apparatus and a multiplexing transmission system, capable of synthesizing a plurality of image information having frame frequencies different from each other, which has been transmitted from a plurality of image pick-up cameras, at a side of a reproducing apparatus without causing a sense of incongruity.

To achieve the above-described object, in either a multiplexing apparatus, or a multiplexing system for an image signal, according to the present invention, this multiplexing apparatus is constructed of: a plurality of delay compensating circuits (6-a, 6-b, . . . , 6-d) for temporarily storing a small frame (will be discussed in FIG. 3A) constructed of a plurality of image signals which are transmitted from the plural television cameras via the variable-length encoding circuits; a plurality of frame head code detecting circuits (21-a, 21-b, . . . , 21d) for detecting frame start codes (PSC) from the respective small frames; a plurality of removing circuits (23-1, 23-b, . . . , 23-d) for removing the PSC from the respective small frames read out from the delay compensating circuits; and a control circuit (24) connected to each of said frame head code detecting circuits, for detecting whether or not a new small frame has been written into the respective delay compensating circuits, and for executing such a control to form a large frame (will be discussed in FIG. 5) which is sent out to a transmission path by employing either the small frames all of which have been stored into said delay compensating circuits, or a small frame of a predetermined dummy signal in response to the detection result. Also, at the side of the reproducing units (12, 13, 14), while a screen is reconstructed, if there are the transmitted small frames are employed to reproduce the image. To the contrary, if there is no corresponding small frame (in case of a dummy signal), then the small frames which have been transmitted during the previous transmission operation are again utilized to reproduce the image. It should be noted that although only one reproducing apparatus is disclosed in FIG. 2, a plurality of reproducing apparatuses are actually employed to be connected to the television cameras.

In accordance with the present invention, since only the small frames having the high frame frequency (concretely, the dummy signal is contained) are contained into the large frame without containing the small frames having the relatively low frame frequency, and then are transmitted to the reproducing apparatus sides, the images with large information amounts derived from the television cameras can be sequentially updated at the receiver apparatus sides for image observation. As a consequence, a TV conference can be achieved without producing a sense of incongruity.

The foregoing and other objects, advantages, manners of operation and novel features of the present invention will be understood from the following detailed description when read in conjunction with the accompanying drawings.

BRIEF DESCRIPTION OF THE DRAWINGS

FIG. 2 is a schematic block diagram of an arrangement of a multiplexer transmission system 1 for an image signal according to a preferred embodiment of the present invention;

DESCRIPTION OF THE PREFERRED EMBODIMENTS

Figure 1:
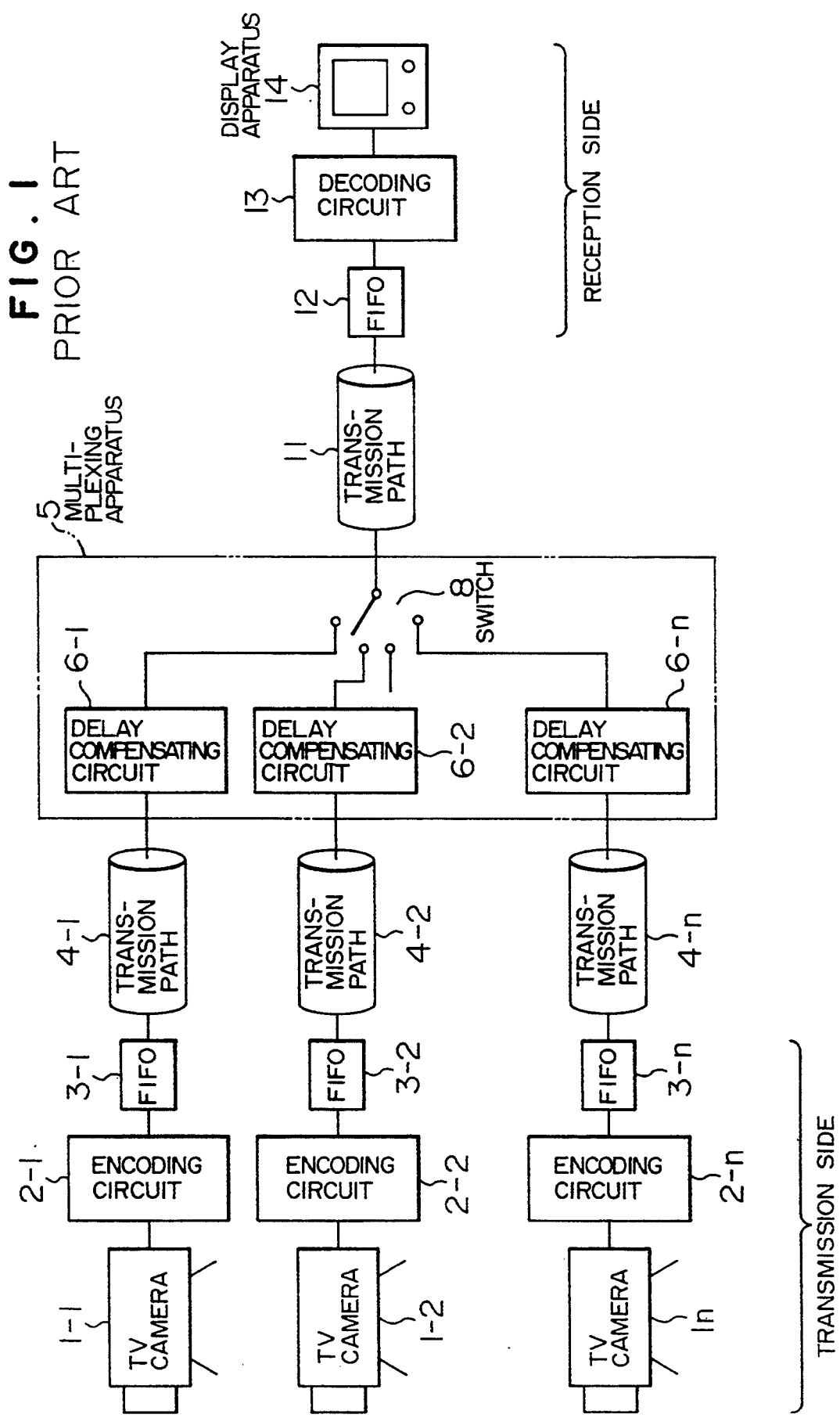
FIG. 1 is a schematic block diagram of a conventional multiplexer apparatus for the image signal.

Before describing various preferred embodiments, a multiplexer apparatus according to the present invention will now be summarized. The multiplexer apparatus is constructed by employing a plurality of memory devices for storing signals of the respective small frames which have been variable-length-encode and derived from a plurality of image signal sources. Also, this multiplex apparatus includes a plurality of detecting circuits for detecting a picture start code indicative of a signal head of each small frame from input signals to the respective memory devices; and a plurality of removing circuits for removing the picture start code representative of the signal head of the respective small frames from the output signal of the respective memory devices. Furthermore, the multiplex apparatus includes a control circuit for constructing a large frame signal from the small frame signals, the number of which is equal to, at the most, the number of the image signal sources, in which the signals derived from the detecting circuits are used as the inputs and correspond to the small frame signals which have not been transmitted from the memory devices; and adding circuit for adding the picture start code to each of the large frames.

It should be understood that a frame implies an image signal of one picture (screen), whereas a small frame and a large frame imply each of image signals which have not yet been multiplexed and appear at a transmission terminal, and an image signal of a picture which is multiplexed and transmitted.

In the above-described circuit arrangement, a plurality of image signal sources are mainly image pick-up cameras. Depending upon positions of these image pick-up cameras, signal transmission paths may be provided either between a plurality of image signal sources and a plurality of encoding circuits, or between a plurality of encoding circuits and a plurality of memory devices.

As the picture start code indicative of the head of the small frame and the picture start code added to each of the large frame, PSC (Picture Start Code) may be employed which is referred to as an "H.261" in the method for encoding images at high efficiency, that is standardized by CCIT (Comité' Consultatif International Télégraphique et Téléphonique).

In other words, in accordance with the high-efficiency encoding method of H.261, a code word used to identify a head of a frame is referred to a "PSC", a screen (picture) of this frame is subdivided into 12 screens which correspond to a Group of Block (GOB), a code word called as a GOB start code (GBSC) is defined as the code word for identifying the head of the respective subdivided screens, and a code word indicative of a position of the respective subdivided screens is transmitted together with these code words. Other code words than the code words in the high-efficiency encoding method of H.261 may be, of course, utilized.

In most encoding apparatuses, since signals are encoded at a high efficiency, a length of each small frame and a bit number are varied, and then a transmission frame number (namely, frame rate) per second is varied. Accordingly, in accordance with the present invention, an amount of information by a variable-length code may be matched with a speed of a transmission path when a plurality ("n" pieces) of small frames are multiplexed, by directly multiplexing the code words of at the most "n" pieces of small frames within the large frame, not by once decoding these code words, depending upon the condition of the coding bits. As will be described later with reference to FIG. 4, in case that there is a transmitter (terminals A and D in this drawing) at the transmission side, the frame frequency (i.e., quantity of small frames transmitted per second) is low, the large frame is constituted by only the frame is constituted by only the small smalls at the terminal "B", the frame frequency of which is relatively high, and the large frame is constituted by two small frames at the terminals B and C, so that the transmissions of the small frames (namely, small frames such as the terminals A and D) are properly thinned out.

Referring now to drawings, a multiplex transmission apparatus according to a preferred embodiment of the present invention will be explained.

FIG. 2 is a schematic block diagram for indicating an arrangement of a multiplexer transmission system of an image signal according to one preferred embodiment of the present invention. A portion 5 surrounded by a dot line shown in FIG. 2 corresponds to a multiplexing circuit apparatus of an image signal as a featured portion of the present invention. Other portions are essentially identical to those of the conventional multiplex transmission system. First of all, the conventionally known circuit arrangement will now be explained. It should be noted in this preferred embodiment that 4 transmission terminals are employed.

Image signals picked up by television cameras 1-$a$, . . . , 1-$d$ (will be summarized as "1-$i$" hereinafter) are encoded at a high efficiency by 4 encoding circuits 2-$i$ provided at the transmission side to produce variable-length encoded signals.

This high-efficiency encoding process is carried out by the above-described method for encoding images at high efficiency, which is standardized and called as H.261. That is to say, with respect to image information, the image signals become variable-length encoded signals to which the movement compensation frame prediction and the discrete cosine transformation have been performed in order to remove redundant information. Furthermore, a header containing a frame head word representative of a frame head is added to the variable-length encoded signal, thereby constituting a small frame. The signals of the small frames are stored into FIFO (3-$i$) corresponding to these four television cameras (1-$i$), and then are sent out to the respective transmission paths 4-$i$ at a constant velocity. The encoded words which have been transmitted via the transmission paths 4-$i$ to the multiplexing circuit apparatus 5, are multiplexed and synthesized with a large frame by the multiplexing circuit apparatus 5 for the image signal (will be discussed later), and then are sent to a transmission path 11. After the encoded signals of the large frame transmitted from the transmission path 11 have been stored into a FIFO 12 provided at the reception side, these encoded signals are decoded by a decoding circuit 13 into an original image signal, and displayed on a display apparatus 14.

Figure 3A:
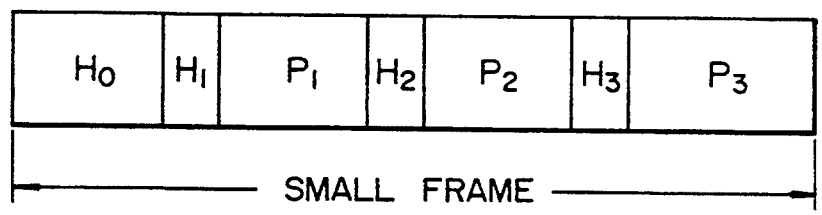
FIGS. 3A and 3B are explanatory diagrams explaining an operation that all of small frames are inserted into a large frame.

The circuit portion of the multiplexing circuit apparatus 5 surrounded by the dot line shown in FIG. 2 will now be explained with reference to a frame arrangement diagram shown in FIGS. 3A and 3B.

The signals of the small frames which have been transferred via the transmission paths 4-$i$ to the multiplexing circuit apparatus 5, are stored into the delay compensating circuit 6-$i$ of the multiplexing circuit apparatus 5. As represented in FIG. 3A, the small frame signals appearing at a plurality of transmission terminals own a header "$H_0$" indicative of a head of the small frame, and a plurality of headers $H_1$, $H_2$, $H_3$ representative of positions on a screen of a large frame. After these headers $H_1$, $H_2$, $H_3$, high-efficiency encoded signals $P_1$, $P_2$, $P_3$ of image signals are positioned respectively. Since the high-efficiency encoded signals are variable-length encoded signals, a length of 1 frame is varied. The reason why the number of plural headers $H_1$, $H_2$, $H_3$ indicative of the position on the screen is selected to be 3, is to be matched with the high-efficiency encoding method of the image signal which is so-called as H.261 standardized by CCITT. A code word (Picture Start Code) for identifying the head of the frame is employed to the header $H_0$, whereas a code word (GOB Start Code) for identifying a head of each subdivided screen obtained by subdividing a screen of a large frame into 12 subscreens, is allocated to each of three headers $H_1$, $H_2$, $H_3$ indicative of the positions on the screen, as shown in FIG. 3B.

Figure 3B:
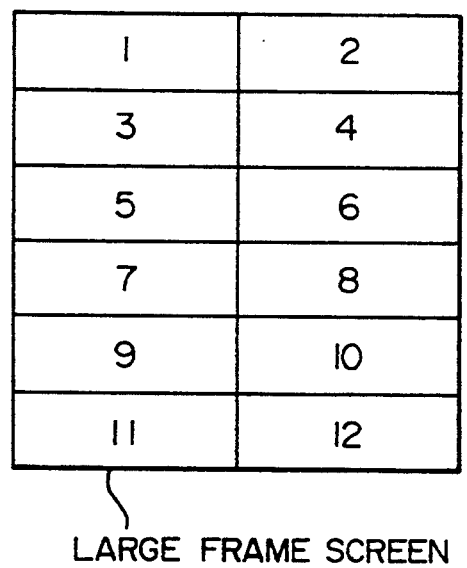

It should be noted that values from 1 to 12 may be allocated by the respective encoding circuits 2-$i$, as shown in FIG. 3B, as the positions on the screen indicated by the headers $H_1$, $H_2$, $H_3$, and also values of 1, 3 and 5 indicated in the upper left portion of FIG. 3B may be allocated at the respective terminals, and after these values are substituted within the multiplexing circuit into values from 1 to 12 which will be allocated.

Frame head code word detecting circuits 21-$i$ which are provided at input units of the respective delay compensating circuits 6-$i$, decode the code words transmitted via the respective transmission paths 4-$i$ to detect the small frame head code word PSC. In other words, the frame head code word detecting circuits 21-$i$ detect that the storage operations of the previous frame into the delay compensating circuits 6-$i$ have been completed, and announce to a control circuit 24, such a message that the small frame head code word has been detected.

Frame head code word detecting circuits 22-$i$ employed at input units of the respective delay compensating circuits 6-$i$, decode the code words read out from the delay compensating circuits 6-$i$, to sense a code word PSC indicative of a head of a small frame, announce such a message that all of 1 frame has been completely read out to the control circuit 24, and also drive removing circuits 23-$i$ for removing the small frame head code words, whereby the frame head code words PSC are eliminated.

Figure 4:
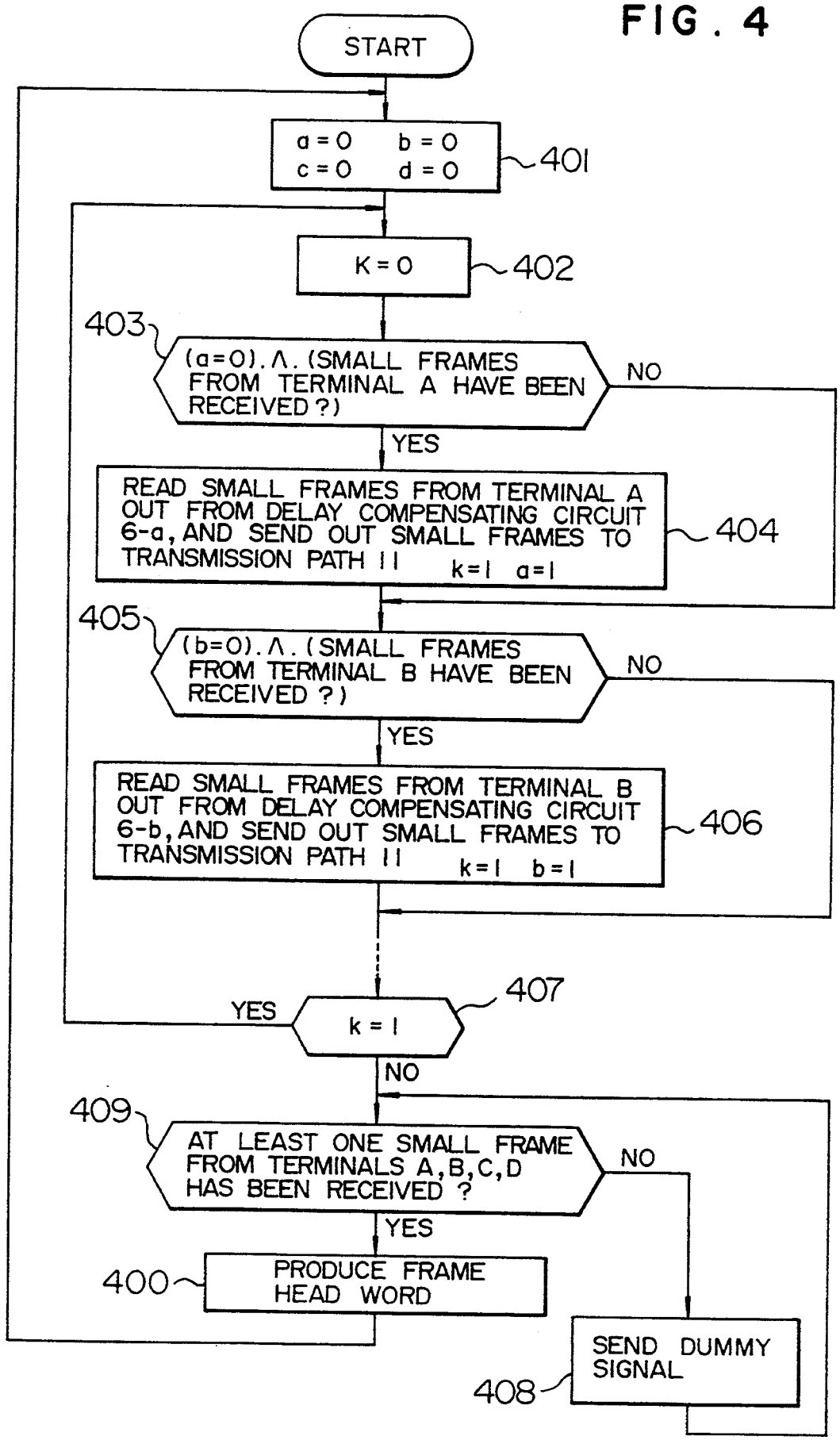
FIG. 4 is a flow chart representing an operation of a control circuit employed in the multiplexer apparatus for the image signal according to the preferred embodiment of the present invention.

The control circuit 24 receives as an input signal, the detection signals derived from the detecting circuits 21-$i$ and 22-$i$ and perform an operation shown in a flow chart of FIG. 4. Concretely speaking, the control circuit 24 controls a switch 8 to select the delay compensating circuits 6-$i$, and reads out the small frame in a unit of 1 small frame from the delay compensating circuits 6-$i$, from which the small frame head code word PSC has been removed. That is to say, the small frame corresponding to such a small frame which has been stored in the delay compensating circuits 6-$i$ and also has not yet been read out therefrom once, is read out from the delay compensating circuits 6-$i$, so that a large frame is formed from these small frames under control of the control circuit 24.

The operations of the control circuit 24 will now be described more in detail with reference to FIG. 4.

The control circuit 24 includes registers "a", "b", "c" and "d" (not shown) corresponding to the transmission terminals "A", "B", "C" and "D", sets the register corresponding to the small frame assembled into the large frame (namely, set to "1"), and resets this register when the code words corresponding to the large frame are read out (namely, set to "0"). In other words, it is prevented that the small frames of the same terminal are not repeatedly entered into a single large frame. A register "K" (not shown) is set when the signals of more than 1 small frame are entered into the large frame (namely, set to "1"), and is reset at a head of an inside loop (402 to 407 shown in FIG. 4), namely set to "0".

A judgement is done as to whether or not the small frame at the terminal "A" has been received under such a condition that the content of the register "a" becomes "0" (at a step 403). If the small frame has been received (namely, "YES"), then the small frame signal at the terminal "A" is read out from the delay compensating circuit 6-a, and furthermore both of the registers "a" and "k" are set (at a step 404). If the small frame has not yet been received (namely, "NO"), then the registers "a" and "k" are not set, but the next register "b" is checked. Subsequently, a check is done as to whether or not the small frame at the terminal "B" has been received under such a condition that the register "b" becomes "0" (at a step 405). If the small frame at the terminal "B" has been received (namely, "YES"), then the small frame signal at the terminal "B" is read out from the delay compensating circuit 6-b, and both of the registers "b" and "k" are set (at a step 406). As described above, the contents of the registers are successively checked.

After a similar process operation to the above-described process operation is carried out with respect to the registers "c" and "d", another check is done whether or not the register "k" is set (k=1) (at a step 407). If the register "k" is not set, then a further check is done whether or not the respective small frames have been received (at a step 409). Until the small frames have been received, a dummy signal (namely, a signal for representing that the previously transmitted image signal is again represented) is sent out (at a step 408). After at least one small frame has been received, the switch 26 is driven to read out the code word PSC (i.e., the head code word of the large frame) is read out from the frame head word generating circuit 25 (at a step 400), and then the registers "a", "b", "c", "d" and "k" are reset (at steps 401 and 402). Also when the register "k" is set, the large frame is formed to be transferred and this register "k" is reset (at a step 402) and the above-described process operation is repeated.

Figure 5:
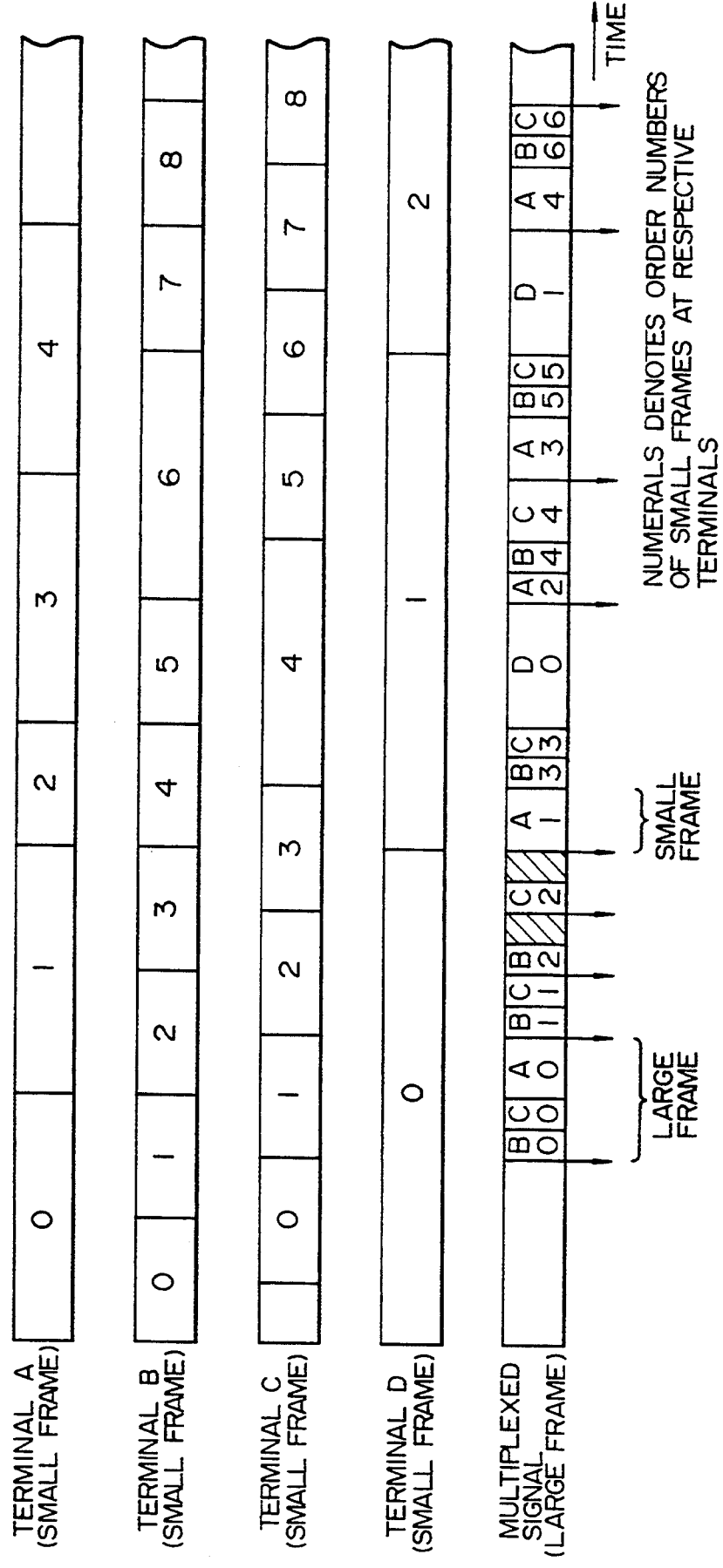
FIG. 5 is a time chart representing a relationship between the small frames and the large frame in the multiplexer apparatus for the image signal according to the preferred embodiment of the present invention.

FIG. 5 is a timing chart for representing small frame signals appearing at the transmission terminals A, B, C, D, and also a large frame signal multiplexed by the multiplexing circuit apparatus in the above-described preferred embodiment. In this drawing, numerals in the small frames denote order numbers of the small frames, and arrows of the large frames, and arrows of the large frame unit indicate sections of the frame. A hatched portion indicates a dummy code. Although the transmission speed of the small frame signal corresponding to the respective transmission terminals A, B, C or D is designed to be matched with the transmission speed of the large frame signal in the multiplexing circuit apparatus 5 over a long time period, the respective frame times are varied within a short time period as shown in FIG. 5. To absorb this variation, both of the delay compensating circuit 6-i and the control circuit 24 function as buffers.

In accordance with this preferred embodiment, as previously explained, at the most 4 small frame signals are transmitted within 1 large frame by the control circuit 24 having such an operation as shown in FIG. 4.

In case that there are such transmission terminals (terminals A and B), the frame frequencies (namely, the number of small frames transmitted per second) of which are lower than those of other transmission terminals C and D, the large frame may be arranged by only B-th frames whose frame frequency is relatively high, and a large frame may be arranged by two small frames B and C, so that the transmissions of the small frames (A, B etc.) may be properly thinned out.

In the decoding circuit 13 provided at the reception side, the frame head code word which is transmitted for each large frame, are detected, so that the decoding operation is carried out for each large frame. At this time, the small frames (for example, B and C at the transmission side) which have been transmitted within the large frame are correctly decoded and displayed. The small frames (for instance, A and D at the transmission side) which have not been transmitted within the garage frame may be displayed by again representing the decoded signals of the small frames which have been transmitted just before the correctly decoded small frames.

Figure 6:
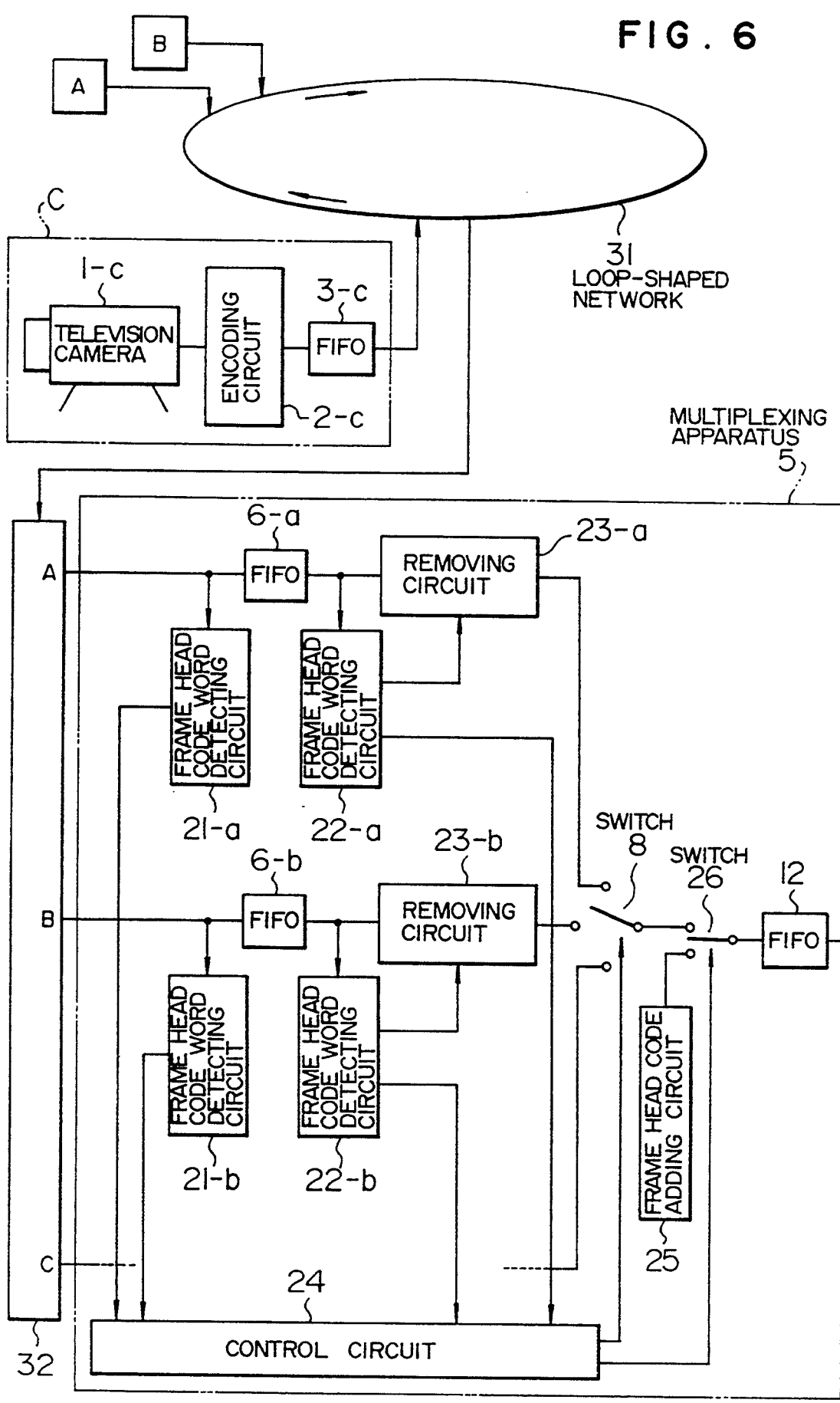
FIG. 6 is a schematic block diagram of an arrangement of a multiplexer transmission system for an image signal according to another preferred embodiment of the present invention.

FIG. 6 is a schematic block diagram of an arrangement of a multiplexer transmission system for an image signal, according another preferred embodiment of the present invention.

According to this preferred embodiment, it is so constructed that encoded signals of small frames derived from a plurality of transmission terminals A, B and C are supplied via a loop-shaped network 31 to the multiplexing circuit apparatus 5.

As is well known in the art, when the respective terminals transmit signals in the loop-shaped network 31, identification signals indicative of own terminal numbers are added to these signals, which will then be transmitted. In front of this multiplexing circuit arrangement 5, a terminal number identifying circuit 32 is provided which decodes the number of the terminal that has transmitted the code word of the small frame. For instance, the code word sent from the terminal A is stored in the delay compensating circuit 6-a. Similarly, the code word of the small frame which is decoded as the code word sent from the terminal B, is stored into the delay compensating circuit 6-b.

The arrangement/operation of the multiplexing circuit apparatus 5 are completely identical to those shown in FIG. 4. That is, when the small frames are stored into the above-explained delay compensating circuits 6-a, 6-b, ..., at the same time, the frame head code word detecting circuit 21 checks the code words to be stored into the respective delay compensating circuits, senses such a fact that all of code words within a single small frame have been received and announces this face to the control circuit 24. Then, the control circuit 24 controls the switch 8 to read out the small frame whose code words have been completely received. To indicate a position to be displayed within a screen, both of the code words indicative of the positions of GBSC and GOB may be added to the head of the small frame.

Furthermore, the frame head code words of the respective small frames are removed by the removing circuit 23, and the frame head code word produced from the head code word generating circuit by controlling the switch 26 is added to the head of the large frame. The control operations of these switches are also performed by the control circuit 24. Since the arrangement of the signal reception side is the same as that of FIG. 2, no further explanation is made.

It should be noted that when a certain one small frame is decoded, small frames other than the decoded small frame may be replaced by the decoded signal to be displayed, or may be displayed after all of small frames within the large frame have been encoded. Alternatively, it may be so arranged that when the changing operation of the displayed screens is carried out every constant time instant, and while this changing operation is executed, only the decoded small frames are newly displayed.

The present invention is not, of course, limited to the above-described preferred embodiments, but may be realized by employing the following arrangements.

(1) Although the fact whether or not the small frames which have not been transmitted within the large frame are present is not transmitted in the above-described preferred embodiment, a code word capable of identifying the small frames (for instance, small frames A and D in the above embodiment) which are not actually sent may be transferred.

In accordance with the high-efficiency encoding method of H.261 which is standardized in CCITT, both of PSC as the code word for identifying the head of the large frame and GBSC for identifying the head of the respective subdivided screens are sent out. Furthermore, the code words indicative of the positions of the respective subdivided screens are sent out. Accordingly, in accordance with the present invention, the small frames which are not transferred may be arranged in such a manner that the code words indicative of the positions of the small frame and GBSC are transmitted by utilizing the GBSC code word in order to identify the small frames which are not transmitted.

(2) Only a portion of a small frame within a code word of a large frame received at the reception side may be decoded to be displayed. Alternatively, the small frames may be decoded as the large frame and only a portion of the small frame may be displayed.

(3) In the above-described high-efficiency encoding method known as H.261, the high resolution mode is achieved as 352 pixels in the horizontal direction and 288 scanning lines in the vertical direction, and the low resolution mode is achieved as 176 pixels in the horizontal direction and 144 scanning lines in the vertical direction.

Thus, the above-described low resolution mode may be selected for the small frame, and the above-mentioned high resolution mode may be selected for the large frame. In this case, one large frame may be arranged by four small frames. With the above-described arrangement, the image is decoded in such a manner that the high resolution mode of the international standard is received at the reception side, so that 4 small frames may be decoded.

As obvious from the foregoing descriptions, a large screen may be made by synthesizing an arbitrary number of small frames with selections of a proper resolution ratio of a large frame to a small frame, other than the above-described resolution ratio.

In accordance with the present invention, neither the decoding circuit, nor the encoding circuit is employed in the multiplexing circuit apparatus. The signals decoded by the decoding circuit employed in the plural transmission units can be directly multiplexed with each other, whereby deterioration of image qualities can be avoided and the delay time can be reduced. Also, the multiplexing circuit apparatus may be utilized even when the frame periods are different from each other at the respective terminals. Only the frame head code word identifying circuit is required, so that the compact and low-cost multiplexer transmission system can be realized.

I claim:

1. A multiplexing system of a image signal, wherein image signals transmitted from an plurality of television cameras are multiplexed to be outputted into a reproducing apparatus, comprising:

a plurality of television cameras arranged at different positions from each other;

a plurality of encoding circuits connected to the respective television cameras, for variable-length-encoding image information sent from the respective television cameras;

a multiplexing apparatus for multiplexing outputs derived from said plural encoding circuits, said multiplexing apparatus being arranged by a plurality of delay compensating circuits for temporarily storing a small frame constructed of a plurality of image signals which are transmitted from the plural television cameras via the variable-length encoding circuits, a plurality of frame head code detecting circuits for detecting frame start codes (PSC) from the respective small frames, removing circuits for removing the PSC from the respective small frames read out from the delay compensating circuits; and a control circuit connected to each of said frame head code detecting circuits, for detecting whether or not a new small frame has been written into the respective delay compensating circuits, and for executing such a control to form a large frame which is sent out to a transmission path by employing either the small frames all of which have been stored into said delay compensating circuits, or a small frame of a predetermined dummy signal in response to the detection result; and a reproducing apparatus connected via said transmission path to said multiplexing apparatus, said reproducing apparatus reproducing an image, while the image is reconstructed, when there are the small frames of the transmitted image signal, by employing said small frames, and also when there is said dummy signal, by again employing the small frames which have been transmitted during the previous transmission.

2. A multiplexing system of an image signal as claimed in claim 1, wherein said delay compensating circuits are constructed of a plurality of FIFO memories corresponding to the image information sent from said television cameras, and said frame head code detecting circuits and said removing circuits are provided at input units and output units of said plural FIFO memories, respectively.

3. A multiplexing system of an image signal, wherein image signals transmitted from a plurality of television cameras are multiplexed to be outputted into a reproducing apparatus, comprising:

a LAN (local area network) for mutually transmitting and receiving data; and a plurality of transmission/reception terminals connected to said LAN, for performing a television conference, each of said transmission/reception terminals being constructed of:

a plurality of television cameras for each converting light reflected from an object to be imaged into an electric signal;

a plurality of variable-length-encoding circuits connected to the respective television cameras, for variable-length-encoding image information sent out from the television cameras;

a multiplexing apparatus for multiplexing outputs derived from said plural encoding circuits, said multiplexing apparatus being arranged by a plurality of delay compensating circuits for temporarily storing a small frame constructed of a plurality of image signals which are transmitted from the plural television cameras connected to each of said transmission/reception terminals via the variable-length encoding circuits, a plurality of frame head code detecting circuits for detecting frame start codes (PSC) from the respective small frames, removing circuits for removing the PSC from the respective small frames read out from the delay compensating circuits; and a control circuit connected to each of said frame head code detecting circuits, for detecting whether or not a new small frame has been written into the respective delay compensating circuits, and for executing such a control to form a large frame which is sent out to said from a plurality of small frames by employing either the small frames all of which have been stored into said delay compensating circuits, or a small frame of a predetermined dummy signal in response to the detection result; and a reproducing apparatus connected via said transmission path to said multiplexing apparatus, said reproducing apparatus reproducing an image, while the image is reconstructed, when there are the transmitted small frames, by employing said transmitted small frames, and when there is no relevant small frame, by again employing the small frames which have been transmitted during the previous transmission.

4. A multiplexing apparatus of an image signal, connected to a plurality of television cameras, for multiplexing encoded image signals from the respective television cameras, comprising:

a plurality of delay compensating circuits for temporarily storing a small frame constructed of a plurality of image signals which are transmitted from the plural television cameras via the variable-length encoding circuit;

a plurality of frame head code detecting circuits for detecting frame start codes (PSC) from the respective small frames;

a plurality of removing circuits for removing the PSC from the respective small frames read out from the delay compensating circuits; and a control circuit connected to each of said frame head code detecting circuits, for detecting whether or not a new small frame has been written into the respective delay compensating circuits, and for executing such a control to form a large frame which is sent out to a transmission path, from a plurality of small frames.

5. A multiplexing apparatus of an image signal as claimed in claim 4, wherein said delay compensating circuits are constructed of a plurality of FIFO memories corresponding to the image information sent from said television cameras, and said frame head code detecting circuits and said removing circuits are provided at input units and output units of said plural FIFO memories, respectively.

* * * * *